(12) United States Patent
Taylor (10) Patent No.: US 10,899,280 B2
(45) Date of Patent: Jan. 26, 2021

(54) PORTABLE WORKSTATION FOR A VEHICLE

(71) Applicant: Stephen Taylor, Independence, MO (US)

(72) Inventor: Stephen Taylor, Independence, MO (US)

( * ) Notice: Subject to any disclaimer, the term of this patent is extended or adjusted under 35 U.S.C. 154(b) by 0 days.

(21) Appl. No.: 16/930,802

(22) Filed: Jul. 16, 2020

(65) Prior Publication Data

US 2020/0346584 A1   Nov. 5, 2020

Related U.S. Application Data

(60) Provisional application No. 62/615,274, filed on Jan. 9, 2018.

(51) Int. Cl.
*B60R 7/04* (2006.01)
*B60N 3/10* (2006.01)

(52) U.S. Cl.
CPC .............. *B60R 7/043* (2013.01); *B60N 3/103* (2013.01); *B60N 3/107* (2013.01)

(58) Field of Classification Search
CPC ................ B60R 7/043; B60R 11/0252; B60R 2011/0075; B60R 11/00; B60R 2011/0085; B60R 2011/0087; B60N 3/002; B60N 3/001; B60N 2/787; B60N 3/10; Y10S 224/929; Y10S 224/926
USPC ......................................... 224/275, 544, 926
See application file for complete search history.

(56) References Cited

U.S. PATENT DOCUMENTS

| | | | | | |
|---|---|---|---|---|---|
| 2,374,409 | A | * | 4/1945 | Gallagher | 248/453 |
| 2,678,682 | A | * | 5/1954 | Thomas | B60N 2/793 312/235.6 |
| 3,279,872 | A | * | 10/1966 | Howke | A47B 31/06 312/235.8 |
| 4,765,583 | A | * | 8/1988 | Tenner | A47B 23/002 108/43 |
| 4,832,241 | A | * | 5/1989 | Radcliffe | B60R 7/043 108/44 |
| 4,942,827 | A | * | 7/1990 | Norgaard | B60N 3/002 108/44 |
| 4,949,890 | A | * | 8/1990 | Schultz | B60R 7/043 224/275 |
| 5,069,375 | A | * | 12/1991 | Flick | B60N 3/005 108/43 |

(Continued)

*Primary Examiner* — Adam J Waggenspack
(74) *Attorney, Agent, or Firm* — Dale J. Ream (57) ABSTRACT

A portable workstation for use in a front passenger seat in an interior of a vehicle includes a body member having a plurality of walls that, together, form a box-shape configuration defining a closed bottom, an open top, and an interior area. The body member includes side walls having lower edges that are angled and increasingly offset from the bottom wall so as to be complementary to a bottom of the front passenger seat. A front wall extends downwardly from the bottom wall and in front of the front passenger seat, whereby to grip the front passenger seat. Walls extend upwardly to form compartments for receiving an article. The portable workstation includes a module attachment assembly having a plurality of upstanding side walls and a top surface defining multiple receiver slots. The workstation includes multiple accessory modules each having at least one boss removably received in a receiver slot.

17 Claims, 11 Drawing Sheets

(56) References Cited

U.S. PATENT DOCUMENTS

| | | | | |
|---|---|---|---|---|
| 5,542,589 | A * | 8/1996 | McKee | B60R 11/0241 224/275 |
| 5,651,525 | A * | 7/1997 | Yang | A47B 23/043 248/456 |
| 5,660,310 | A * | 8/1997 | LeGrow | B60R 7/043 224/275 |
| 6,135,546 | A * | 10/2000 | Demtchouk | B60N 3/002 108/44 |
| 6,422,440 | B1 * | 7/2002 | Stone | B60R 7/043 224/275 |
| 6,426,869 | B1 * | 7/2002 | White | B60N 3/001 108/44 |
| 6,439,525 | B1 * | 8/2002 | Gehring | B60N 3/102 248/311.2 |
| 6,641,102 | B2 * | 11/2003 | Veltri | B60N 3/103 220/737 |
| 7,793,597 | B2 * | 9/2010 | Bart | B60N 3/002 108/44 |
| 7,966,949 | B2 * | 6/2011 | Willey | B60N 3/002 108/44 |
| 8,550,550 | B2 * | 10/2013 | Cassese | B65D 15/00 297/188.18 |
| 10,125,915 | B1 * | 11/2018 | Phifer | F16M 11/041 |
| 10,384,580 | B2 * | 8/2019 | Medina Luna | B60N 3/002 |
| 2006/0124822 | A1 * | 6/2006 | Munda | A47B 23/043 248/454 |
| 2006/0186303 | A1 * | 8/2006 | Phifer | A47B 23/043 248/454 |
| 2014/0175136 | A1 * | 6/2014 | Stevenson | B60R 7/043 224/275 |

* cited by examiner

PORTABLE WORKSTATION FOR A VEHICLE

REFERENCE TO RELATED APPLICATIONS

This application claims the priority of provisional patent application U.S. Ser. No. 62/615,274 filed Oct. 15, 2019 titled Portable Workstation for a Vehicle and which is incorporated in its entirety herein by reference.

BACKGROUND OF THE INVENTION

This invention relates generally to desk assemblies and workstations and, more particularly, to a portable workstation configured for mounting to a front passenger seat of a vehicle. The portable workstation enables a driver to accomplish work while in his car and have everything he needs within reach.

Many occupations are characterized by employees or subcontractors working from the interior of their vehicles or constantly driving from location to location throughout the day and even many days back to back. For instance, a courier is a person given multiple tasks of delivering important papers, pharmaceuticals, testing supplies, or equipment parts to many different persons and locations—all of which must be documented by the courier throughout the day and often using a laptop computer, tablet, or customer forms that must be filled out. Another occupation having similar duties if that of an insurance claims adjuster who spend his day driving from location to location to look at storm damage, estimate claims and, in some cases, actually cutting checks. Much of this is done from the front of the adjuster's car via a laptop computer and manual forms to fill out. While driving, the worker frequently picks up fast food items and looks for places in the already crowded car to place a hamburger, fries, and a drink (or the like). Similarly, the worker may have even more clutter keeping track of compact disc cases or the CD's themselves, whether computer software, data, or music related.

Various portable workstations for a vehicle have been proposed in the art. Although presumably effective for their intended purposes, the existing devices are still inadequate to meet the needs and challenges of business professionals who essentially work from their vehicle. The existing devices do not have a docking area to which at least three different assemblies may be selectively and individually mounted depending on the need and desire of a driver. Finally, the workstation must be securely attached to the front passenger seat of the vehicle so as not to be moved during normal driving, turning, or hitting bumps in the road.

Therefore, it would be desirable to have a portable workstation for a vehicle that includes at least three modes of attachment to a vehicle seat so as to work with virtually any automobile. Further, it would be desirable to have a portable workstation for a vehicle that includes a desk assembly module, a food tray module, and a disc module that are removably and selectively mounted to a module pocket of the portable workstation.

SUMMARY OF THE INVENTION

A portable workstation for use in a front passenger seat in an interior of a vehicle according to the present invention includes a body member having a bottom wall, a pair of side walls, a rear wall, and a front wall that, together form a box-shape configuration defining a closed bottom, an open top, and an interior area. The body member includes a pair of side walls includes lower edges that are each angled and increasingly offset from the bottom wall so as to define a configuration complementary to a bottom portion of the front passenger seat. The front wall is perpendicular to the bottom wall and extends downwardly away from the bottom wall and in front of the front passenger seat, whereby to grip the front passenger seat. A plurality of interior walls extends upwardly from the bottom wall and being spaced apart so as to define a plurality of compartments within the interior area, each the compartment having an open top so as to define an interior area for receiving an article.

Further, the portable workstation includes a module attachment assembly having a plurality of upstanding side walls extending upwardly from the bottom wall and having a top surface connected to upper edges of the plurality of stand upstanding side walls and defining a plurality of receiver slots. Then, any of multiple accessory modules includes an attachment portion that includes at least one boss removably received in the plurality of receiver slots, the accessory module having a lower wall coupled to the attachment portion and a plurality of module side walls extending upwardly from the lower wall and defining an open top and an inner space configured to receive an article. The accessory module includes a food module, a compact disc holder, or a rotatable desk accessory.

Therefore, a general object of this invention is to provide a portable workstation that is configured for securement in a front passenger seat of a vehicle.

Another object of this invention is to provide a portable workstation, as aforesaid, having at least one and, preferably, several structures for securing the portable workstation to the passenger seat.

Still another object of this invention is to provide a portable workstation, as aforesaid, having at least one but preferably multiple accessory modules that are removably attachable to an accessory attachment assembly on a body member of the portable workstation.

Yet another object of this invention is to provide a portable workstation, as aforesaid, in which the accessory modules include a rotatable desk accessory, a foot holding module, and a compact disc module.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2c is a perspective view from a bottom angle of the portable workstation as in FIG. 2a;

FIG. 3a is a rear perspective view of the portable workstation as in FIG. 1a;

FIG. 3b is an isolated view on an enlarged basis taken from FIG. 3a;

FIG. 4b is an isolated view on an enlarged basis taken from FIG. 4a;

DESCRIPTION OF THE PREFERRED EMBODIMENT

A portable workstation for a vehicle according to a preferred embodiment of the present invention will now be described with reference to FIGS. 1 to 9*f* of the accompanying drawings. The portable workstation 10 includes a body member 11, at least three structural means for attaching the body member to a front passenger seat 4 of a vehicle, a plurality of compartments for holding and organizing articles, a module attachment assembly, and multiple modules removably and selectively coupled to the module attachment assembly.

Figure 1:
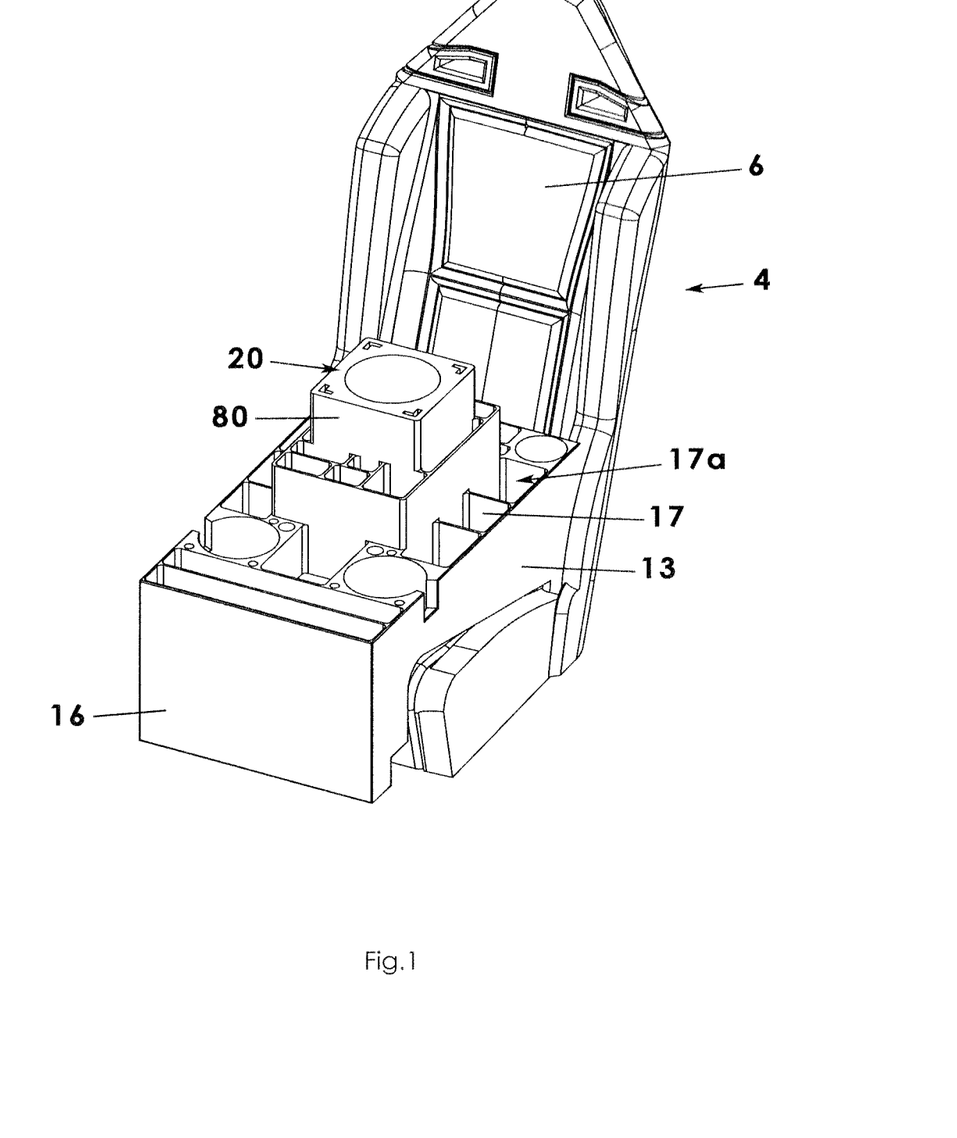
FIG. 1 is a perspective view of a portable workstation for a vehicle according to a preferred embodiment of the present invention and illustrated showing use in a vehicle seat.

A vehicle includes a front passenger seat 4, standard seatbelts such as a shoulder seatbelt and a lap seatbelt. The passenger seat may include a seat portion 8 and a back portion 6. All too often, a driver of the vehicle simply piles his work, files, cell phone, other electronic devices, and even fast food on the passenger seat. The present invention is able to remedy this problem by its unique and functional structures as will be described below.

The portable workstation 10 includes a body member 11 that forms the many compartments 17*a* and includes structures to which other components of the invention may be attached. More particularly, the body member 11 may include a bottom wall 12, a pair of side walls 13, a rear wall 14, and a front wall 16 that, together, form a generally box-shaped structure having a closed bottom and defining an open top and an interior area. The body member 11 is not a perfect rectangular structure as the side walls 13 extend downwardly below the bottom wall 12. Likewise, the rear wall 14 extends downwardly beyond the bottom wall 12. Together the bottom or inner surfaces of the bottom, rear, and side walls define a space that will be referred to as an inner underneath area.

The body member 11 includes a plurality of interior walls 17 extending upwardly from the bottom wall and that are spaced apart in specific dimensions so as to define a plurality of compartments 17*a* within the interior area. Each compartment defines an open top so as to define an interior area for receiving an article as will be described later as being exemplary but not limiting.

As illustrated, each one of the side walls 13 include lower edges that extend downwardly below the bottom wall 12 at an angle that is increasingly offset from the bottom wall 12. The angled configuration is complementary to an angle of the seat portion of the front passenger seat 4 such that the bottom wall 12 and compartments 17*a* remain level in use (FIG. 1). In another aspect, the body member 11 may include at least a pair of leveling feet 90 that are threadably attached and operable to rotate (i.e. to vary in length) to make the body member 11 level in the seat.

Figure 2A:
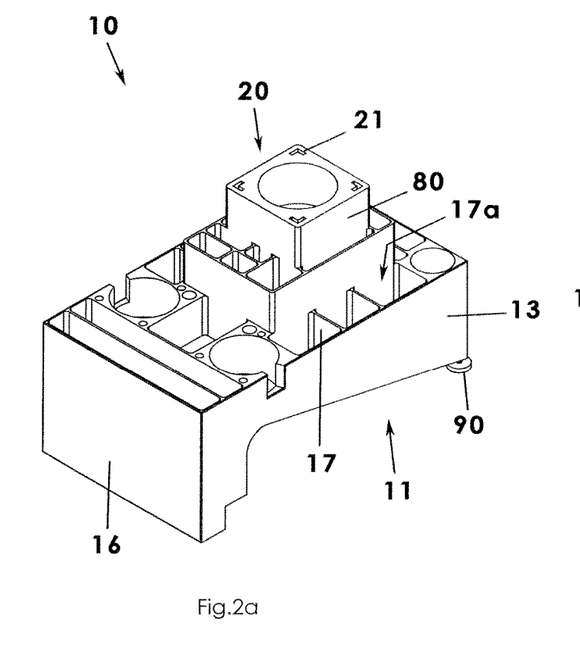
FIG. 2a is a perspective view of the portable workstation as in FIG. 1.
Figure 2B:
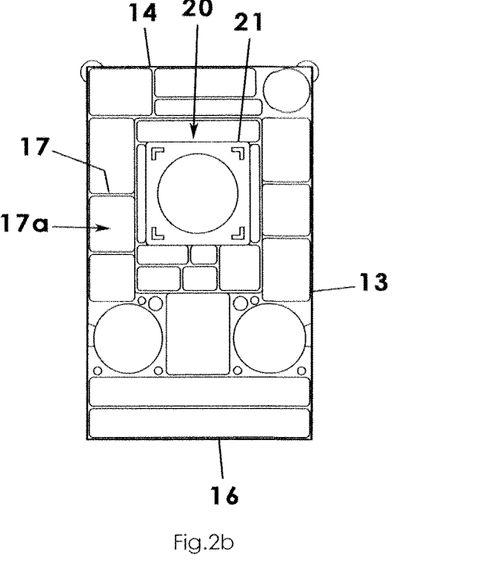
FIG. 2b is a top view of the portable workstation as in FIG. 1.

The portable workstation 10 includes at least three structures for releasably coupling the body member 11 to the front passenger seat 4 of a vehicle such that the body member 11 may be easily removed and installed in another car or even carried inside the user's home or workplace. The first attachment structure does not include its own strap or even use a vehicle seat belt. Instead, the body member 11 of the workstation 10 includes a structure that gently mates with or grips the passenger seat 4. More particularly, seat portion 8 of the passenger seat 4 has a front that is upstanding or vertical relative to a top of the passenger seat which is generally horizontal in orientation. The front wall 16 of the body member 11 is also upstanding or vertical, extends downwardly below a bottom of the bottom wall 12 of the body member 11, and has a configuration that is complementary to the front of the passenger seat 4. Accordingly, the front wall 16 of the body member 11 bears against and essentially "hugs" the front of the passenger seat 4—effectively restraining rearward and lateral movements of the body member 11 when positioned on the passenger seat 4. The front wall 16 of the body member 11 is best shown in FIGS. 1 and 2. From a bottom perspective view, the front wall 16 may include a stair-stepped configuration that essentially sandwiches top and front surfaces of the passenger seat 4 for an even more secure mounting thereon.

Figure 2C:
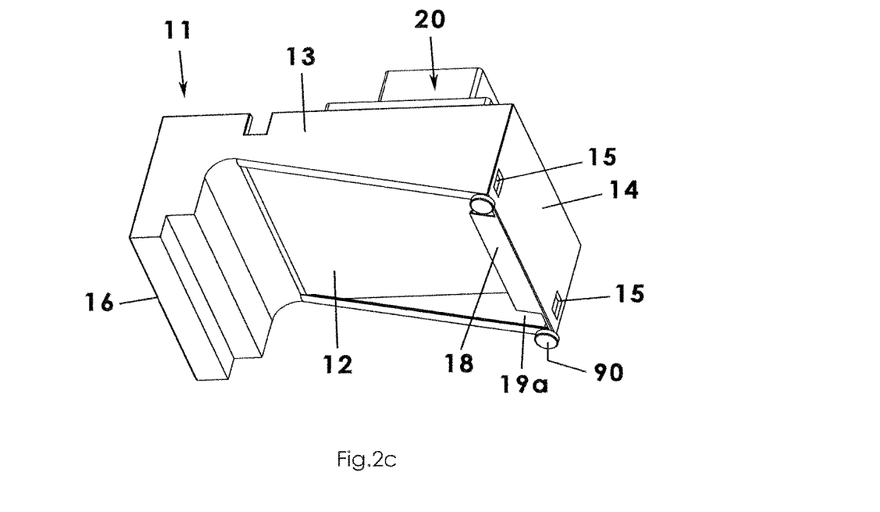
Figure 3A:
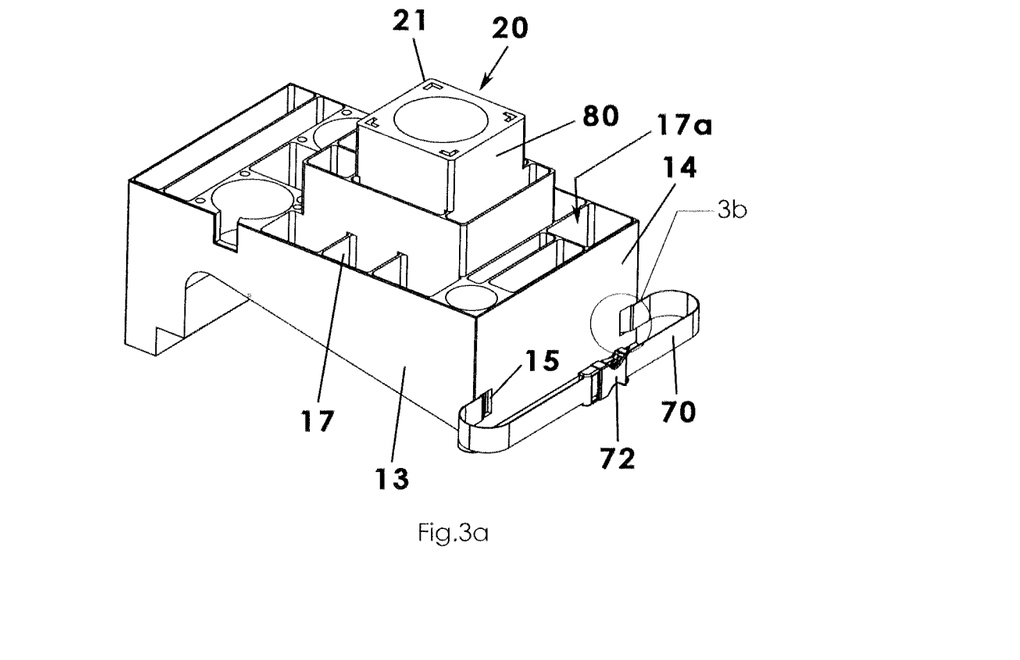
Figure 3B:
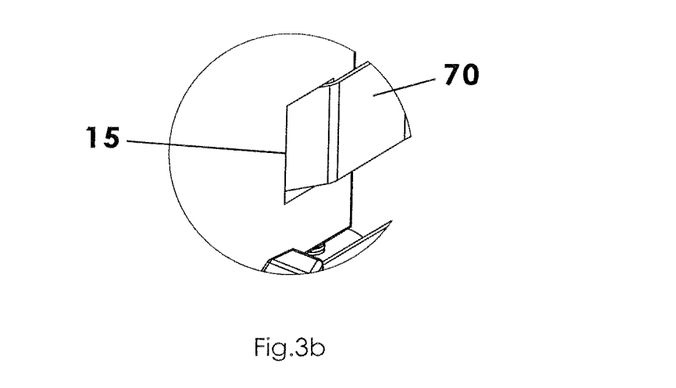

The portable workstation 10 includes a second structure for attaching the body member 11 to the passenger seat 4. Specifically, the rear wall 14 of the body member 11 defines a pair of slots 15 with one slot being positioned proximate each side wall 13 of the body member 11, respectively (FIG. 2*c*). Further, the second attachment means includes a safety belt 70 having an elongate configuration. The safety belt 70 has opposed ends and a fastener, such as a buckle 72, at each end. The safety belt 70 may be threaded through the pair of slots 15 and through the inner underneath area and also extended around the back portion 6 of the passenger seat 4 where the buckles 72 may be engaged, effectively coupling and securing the body member 11 of the portable workstation 10 to the passenger seat 4.

Figure 4A:
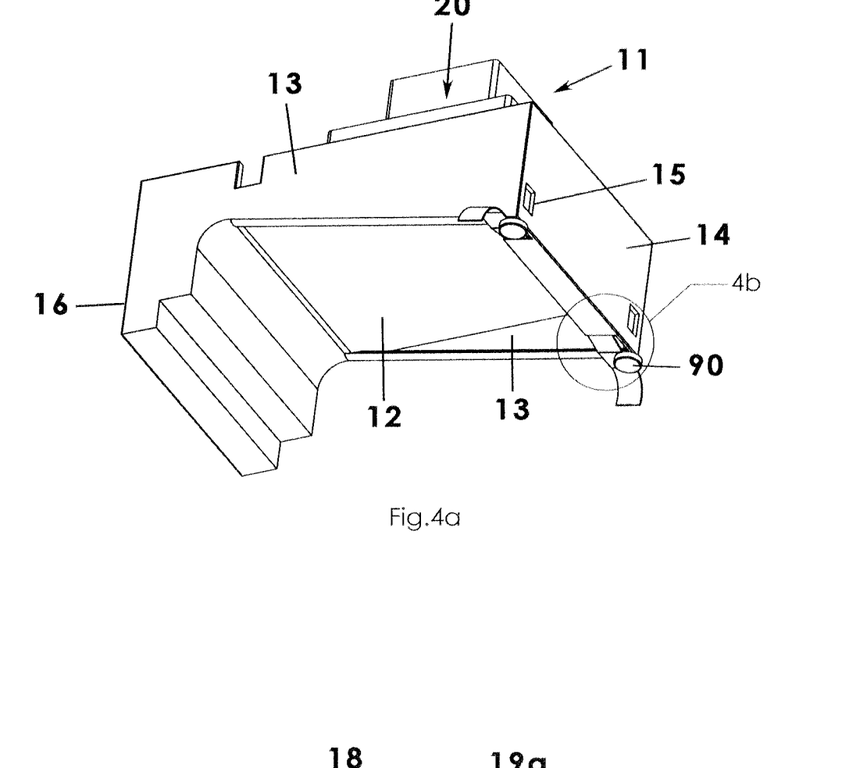
FIG. 4a is a perspective view from a bottom angle of the portable workstation as in FIG. 2a, illustrated in use with a vehicle lap seatbelt.
Figure 4B:
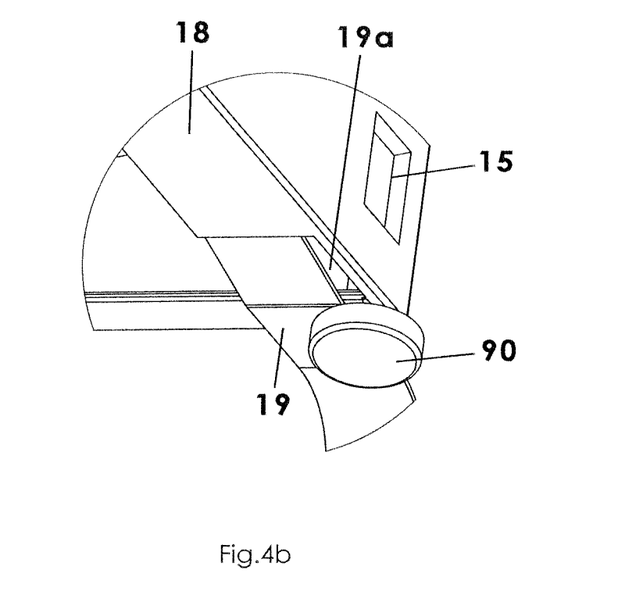
Figure 5A:
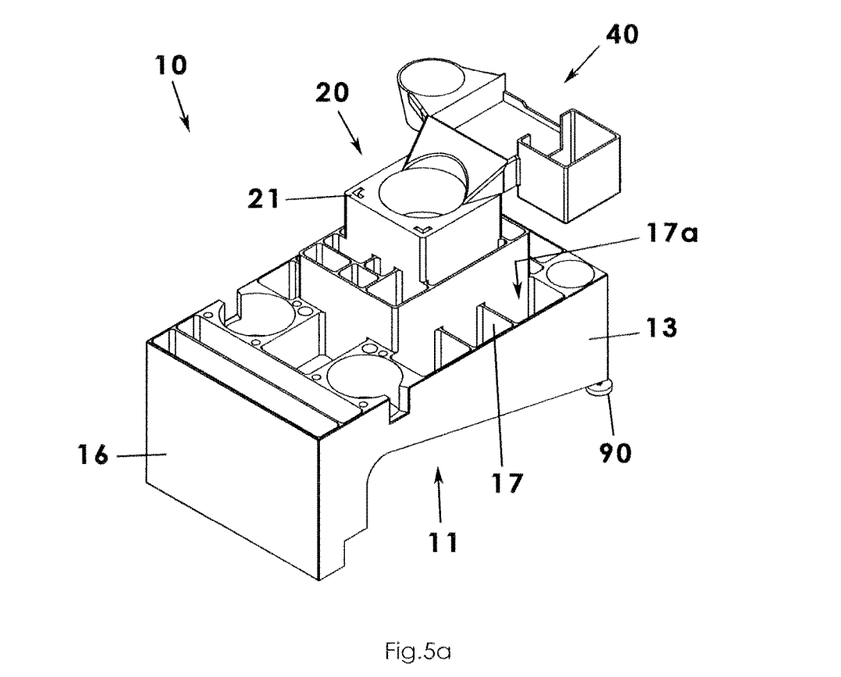
FIG. 5*a* is a perspective view of the portable workstation with a food module attached.
Figure 5B:
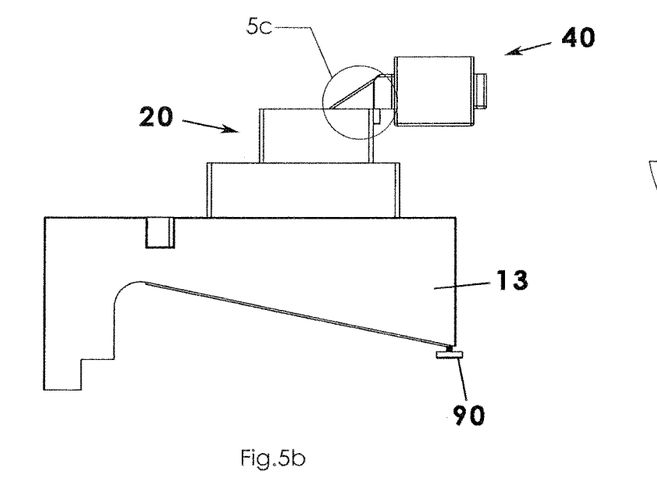
FIG. 5*b* is a side view of the portable workstation as in FIG. 5*a;*
Figure 5C:
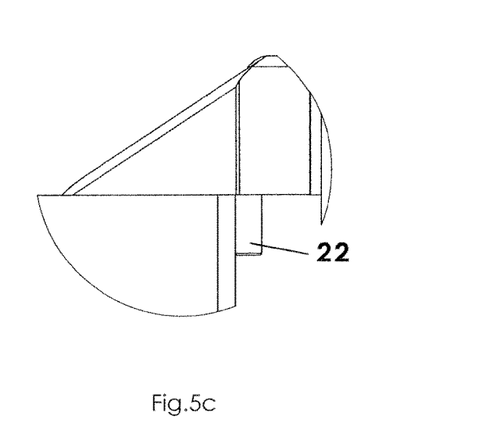
FIG. 5*c* is an isolated view on an enlarged basis taken from FIG. 5*b;*
Figure 6A:
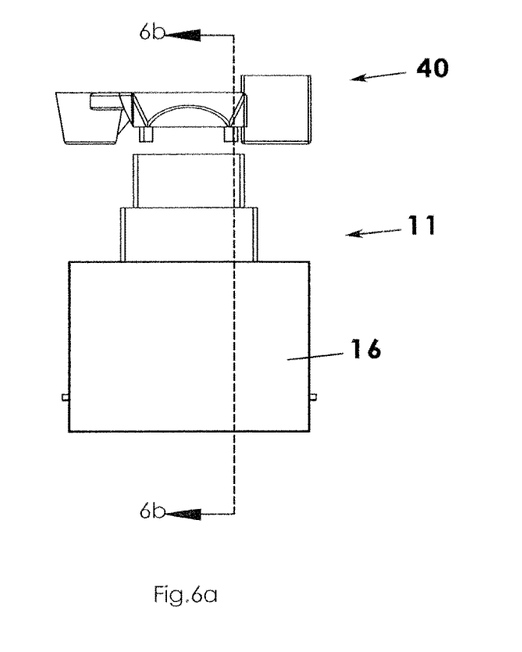
FIG. 6*a* is a front view of the portable workstation as in FIG. 5*a;*
Figure 6B:
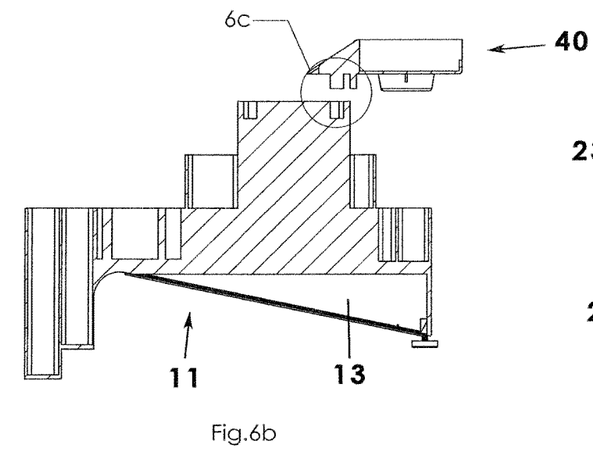
FIG. 6*b* is a sectional view taken along line 6*b*-6*b* of FIG. 6*a;*
Figure 6C:
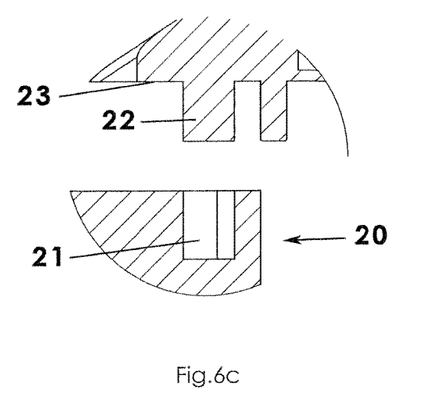
FIG. 6*c* is an isolated view on an enlarged basis taken from FIG. 6*b;*

Further, the portable workstation 10 includes a third attachment structure for attaching the body member 11 to the passenger seat 4. Specifically, a securing shelf 18 is coupled to the inner surface of the rear wall 14 proximate a lower edge thereof and is configured to extend substantially between the pair of side walls 13 although an opening 19*a* is defined between an end of the shelf 18 and side wall 13, respectively (FIG. 4*b*). Then, this third attachment structure is intended to work with the lap seatbelt 19 of the vehicle. More particularly, the lap seatbelt 19 may be laid atop the shelf 18, threaded through respective openings 19a and clicked into a vehicle belt buckle (not shown) in a conventional manner, thus securing the body member 11 of the workstation 10 to the passenger seat 4.

In another aspect, the portable workstation 10 includes what will be referred to as a module attachment assembly 20 to which various modular assemblies may be removably attached. The module attachment assembly 20 may include a plurality of upstanding side walls 13 extending upwardly from the bottom wall 12 although various intermediate walls may be positioned intermediate the bottom wall 12 and upstanding side walls 80. The module attachment assembly 20 may have a generally cubical configuration although other shape configurations may also work. Further, the module attachment assembly 20 may include a top surface connected to upper edges of said plurality of upstanding side walls 80 and that may define a plurality of receiver slots 21 configured to facilitate a mounting of the accessory modules as will be described below. With further regard to the possibility of a plurality of intermediate side walls, the body member 11 may be built to include several layers of upstanding walls arranged in a triangular, pyramidal, or other arrangement and, more particularly, may be referred to as a ziggurat configuration (which refers to an architectural style in ancient Mesopotamia having a stepped tower or temple).

Each accessory module may include certain structures in common. For instance, each accessory module includes a lower wall 23 having at least one boss 22 but, preferably a plurality of boss members. Each boss has a configuration complementary a configuration of a receiver slot 21 and is operable to be received into the receiver slot 21. Accordingly, a module accessory is removably coupled to the module attachment assembly 20 by a friction fit coupling of corresponding boss and receiver slot structures. Further, a module accessory includes a plurality of module side walls extending upwardly from the lower wall of the accessory module, the upwardly extending module side walls defining an open top and an inner space configured to receive an article.

Figure 7A:
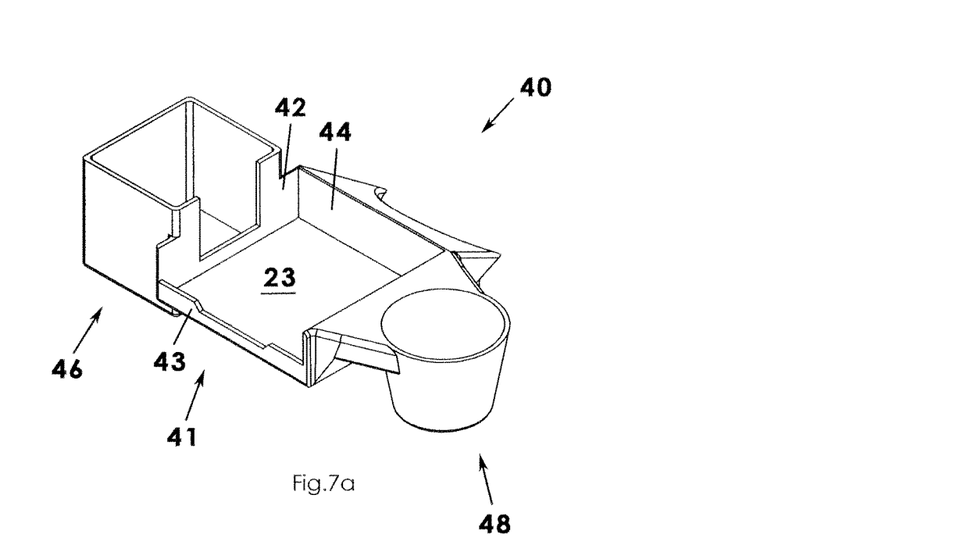
FIG. 7*a* is a perspective view of the food module as in FIG. 5*a*, illustrated removed from a body member of the portable workstation for clarity.
Figure 7B:
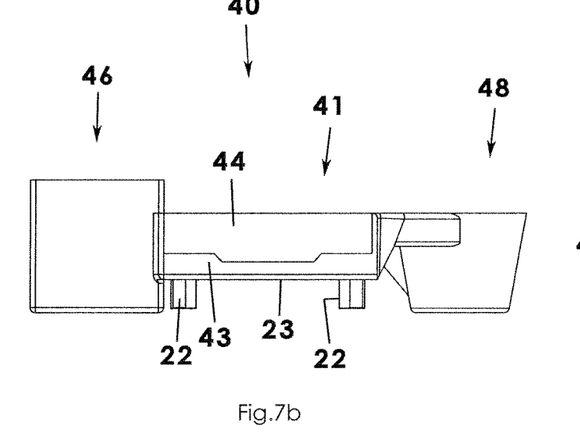
FIG. 7*b* is a front view of the food module as in FIG. 7*a;*
Figure 7C:
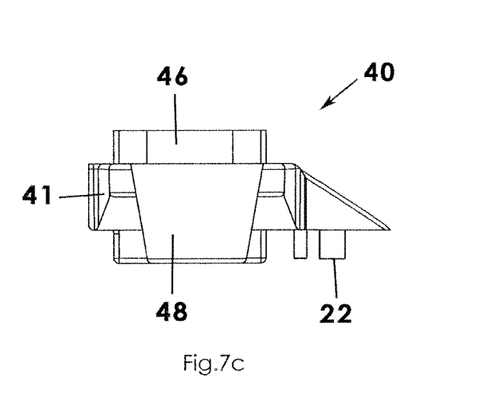
FIG. 7*c* is a side view of the food module as in FIG. 7*a;*

Now with reference to the specific module accessories, a first module accessory is a food receiving module 40. The food receiving module 40, in addition to the components already described above, includes first, second, and third sections. More particularly, the food receiving module 40 includes a first section 41 in which the plurality of module side walls 42 extend upwardly from the lower wall 23. Further, the first section 41 includes a front wall 43 having a truncated configuration and a rear wall 44 opposite said truncated front wall 43. In addition, the food receiving module 40 may include a second section 46 coupled to one side of the first section 41, the second section 46 having an auxiliary lower wall and a plurality of auxiliary side walls extending upwardly from the auxiliary lower wall that, together, define an open interior area configured to receive another article, such as another food item. Still further, the food receiving module 40 may include a third section 48 coupled to another side of said first section 41 and includes another auxiliary lower wall and a continuous side wall extending upwardly from the another auxiliary lower wall so as to define another open interior area configured to receive another food item, such as a cup.

Figure 8A:
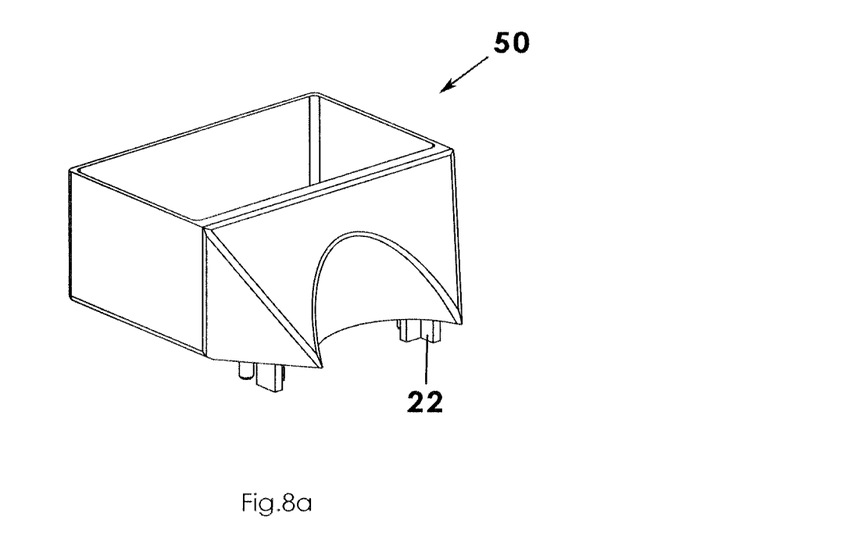
FIG. 8*a* is a perspective view of a disc holder module illustrated removed from the body member of the portable workstation for clarity.
Figure 8B:
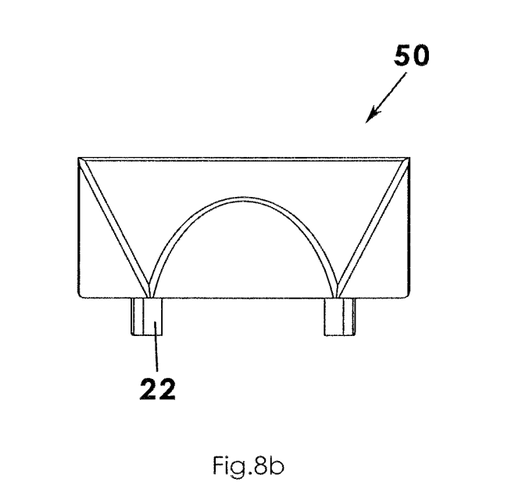
FIG. 8*b* is a front view of the disc module as in FIG. 8*a;*
Figure 8C:
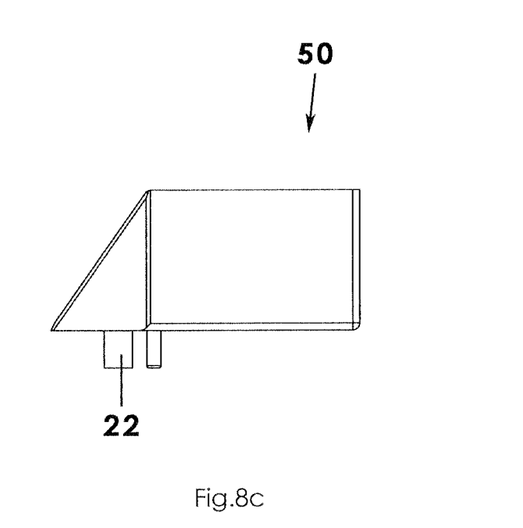
FIG. 8*c* is a side view of the disc module as in FIG. 8*a;*

Further, a second module accessory may be a compact disc holder 50. The plurality of upstanding side walls, described earlier, may have an upstanding configuration that, together, define an open top and interior space configured to receive a plurality of compact discs, CD cases, or the like.

In addition, the portable workstation 10 may include a third module accessory in the form of a desk assembly 30 (FIGS. 9a to 9f). The desk assembly 30 may include a primary base member 31 having a bottom surface and a top surface opposite the bottom surface. Preferably, the bottom surface and the top surface have planer and parallel configurations. A pivot fastener 32 extends upwardly from a center point of the top surface. The pivot fastener 32 may be a bolt or similar hardware. The desk assembly 30 includes an auxiliary base member 33 rotatably mounted to the pivot fastener 32 and positioned atop the primary base member 31, the auxiliary base member 33 being selectively rotatable 360 degrees (i.e. swiveled) about the pivot fastener 32. The primary base member 32 may also be referred to as a lower base member and the auxiliary base member 33 may be referred to as an upper base member such that upper base member may be rotated relative to the lower base member.

Figure 9A:
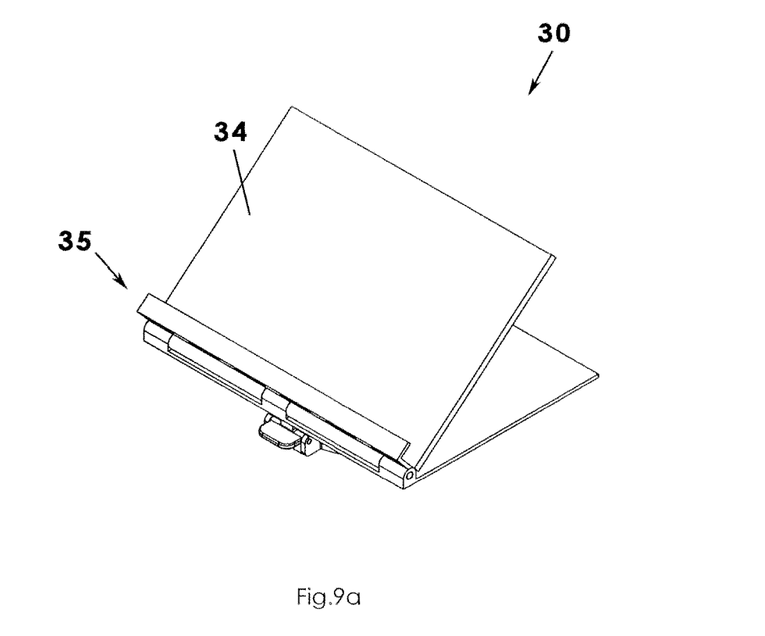
FIG. 9*a* is a perspective view of a desk assembly module according to the present invention, illustrated removed from the body member of the portable workstation for clarity.
Figures 9B, 9C:
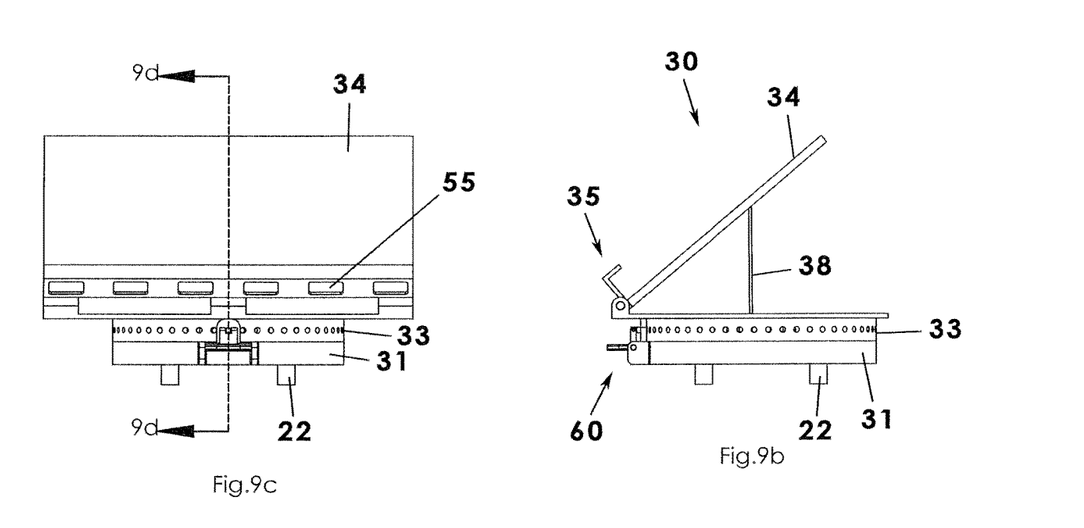
FIG. 9*b* is a side view of the disc module as in FIG. 9*a;*
FIG. 9*c* is a rear view of the disc module as in FIG. 9*a;*
Figure 9D:
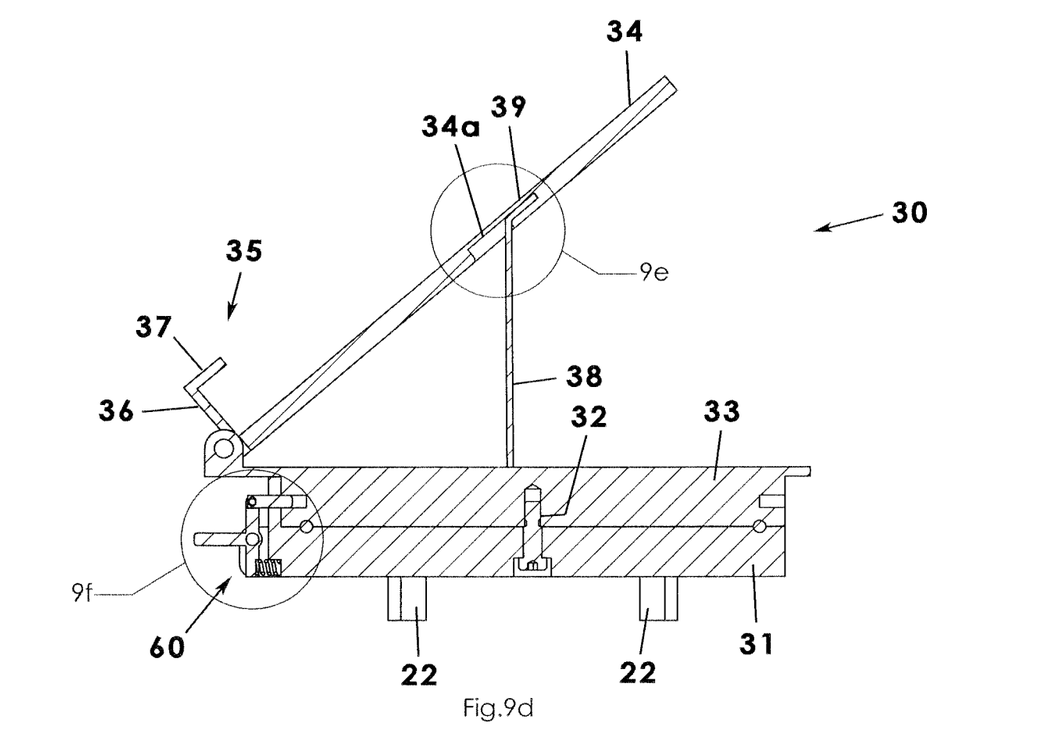
FIG. 9*d* is a sectional view taken along line 9*d*-9*d* of FIG. 9*c;*
Figure 9E:
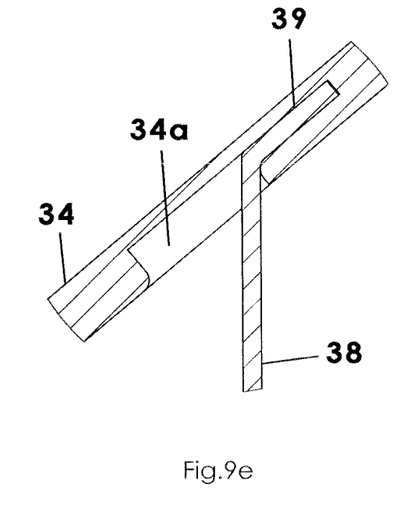
FIG. 9*e* is an isolated view on an enlarged basis taken from FIG. 9*d*.

Further, the desk assembly 30 may include a support member 34 having a proximal edge pivotally coupled to a side edge of the auxiliary base member 33 such as with a hinge and having a planar configuration. The support member 34 is essentially a panel for stowing a laptop computer 3, holding a tablet, or positioning a laptop computer for use. More particularly, the support member 34 is pivotally movable between a closed configuration generally bearing against and parallel to an upper surface of the auxiliary base member 33 and an open configuration displaced at an angle from the upper surface of the auxiliary base member 33.

Now, to actually support an electronic device (such as the computer 3), the support member 34 includes a holding member 35 in the form of a U-shaped bracket extending away from the proximal edge and is configured to support an electronic device. More particularly the holding member 35 (bracket) may include a first portion 36 extending outwardly from the proximal edge and perpendicular to the top surface of the support member. Further, the holding member 35 may include a second portion 37 coupled to and extending away from a distal end of the first portion and that is parallel to the top surface of the support member 34. It is understood that the first and second portions of the holding member 35 along with the top surface of the support member 34 has a U-shaped configuration configured to hold an electronic device. Specifically, the bracket is configured to hold a tablet during use or a laptop computer in a stowed and closed configuration.

In a related aspect, a portion of the U-shaped bracket defines at least one slot configured to receive a cable electrically connected to the electronic device. More particularly, the first portion 36 of the holding member 35 defines at least one slot 55 configured to receive a cable electrically connected to the electronic device. In other words, the bracket may define multiple holes through which computer cables may extend.

Still further, the desk assembly 30 may include a support arm 38 having a generally linear configuration. Specifically, the support arm 38 may include a free end and a bent end 39 opposite the free end. In addition, the support member 34 includes a bottom surface opposite and parallel to the top surface of the support member 34, the bottom surface defining a recessed area 34a having a configuration for receiving the bent end 39 of the support arm 38. The support arm 38 is configured to support the support member 34 in the open configuration when the bent end 39 is positioned in the recessed area 34a of the support member. In another embodiment (not shown), the lower surface of the support member 34 may define multiple recessed areas for receiving the bent end 39 of the support arm 38 for holding the support member 34 at selected angles.

Figure 9F:
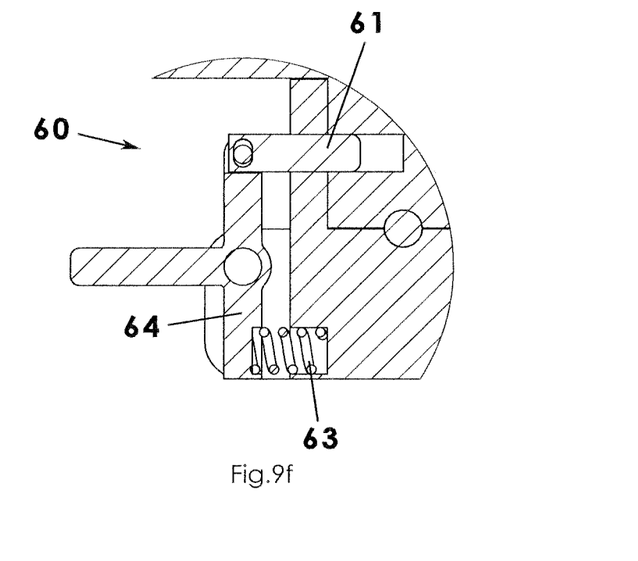
FIG. 9*f* is an isolated view on an enlarged basis taken from FIG. 9*d.*

With further reference to the desk assembly 30, the desk assembly 30 includes a latch assembly 60 operable to selectively allow or prevent movement of the auxiliary base member 33 relative to the primary base member 31. The latch assembly 60 includes a first rod 61 having a linear configuration and movable between an engaged configuration coupled to the auxiliary base member 33 and a released configuration displaced from the auxiliary base member 33. The auxiliary base member 33 may define a channel for receiving the first rod 61 at the engaged configuration. The auxiliary base member 33 is allowed to rotate relative to the primary base member 31 at the released configuration. Further, the desk assembly 30 includes a compression spring 63 that is selectively movable between a normal or uncompressed configuration extending away from the primary base member 31 and a compressed configuration proximate the primary base member 31. In addition, the latch assembly 60 includes a linkage 64 extending between the first rod 61 and compression spring 63 that, when actuated, moves the first rod 61 to the released configuration and the spring 63 to the compressed configuration. As shown in FIG. 9f, pressure against the lower end of the linkage 64 causes a release of the first rod 61 whereas a release of the lower end of the linkage 64 allows the spring 63 to uncompress and move the first rod 61 to the engaged configuration.

With further reference to the body member 11, the upstanding interior walls 17 may be positioned at predetermined places, are constructed with predetermined dimensions, and define predetermined shape configurations so as to receive specific articles. For example, the stepped configuration of the front wall 16, as discussed earlier, enables interior spaces specifically dimensioned to receive a laptop computer and a tablet or the like (FIG. 1). Further, the upstanding walls may also be arranged in a cylindrical configuration appropriate to receive a cup or the like, such as a fast food drink, insulated beverage container, or the like. In like manner, the plurality of upstanding interior walls 17 may be configured to receive articles such as hand sanitizer, facial tissue, notebooks and writing instruments, a cell phone, or anything that a driver may need for working, eating, and computing in his vehicle.

In an embodiment, a side wall 13 and rear wall 14 of the housing include another structural configuration that makes the body member 11 even more universal and user friendly. More particularly, the side wall 13 adjacent the rear wall 14 and the rear wall 14 adjacent the side wall 13 (e.g. the rear corners) may define a cutout (not shown) that is complementary to the bolsters of the seat 4 of the vehicle. Specifically, the passenger seat 4 may include left and right bolsters (i.e. raised portions) intended to keep or urge a person into a center position upon the seat 4. Further, the bolsters may apply gentle pressure on outer portions of a rider's upper legs and buttocks. Unfortunately, these bolsters may inhibit the housing from being held securely or level on the seat. Referring again to the cutout, when viewing a corner of the housing, the cutout may appear to have an inverted V-shape as the corner has essentially been removed. Further, with the cutout of each corner, certain structures described previously will be moved or displaced. For instance, the slots 15 described above may be moved and situated inwardly and adjacent to the cutout. Further, the leveling feet 90 may be situated inwardly and closer one to the other on the shelf 18. Still further, the openings 19a and strap 19 may be situated more inwardly and adjacent the cutout. In this embodiment, it is deemed sufficiently desirable to have the cutout so as to avoid contact with the bolsters of the passenger seat 4 even though the other structures identified above are displaced.

In use, a user (such as a driver) may carry and position the body member 11 in the front passenger seat 4 of a vehicle. The body member 11 includes three structures for securing the portable workstation 10 to the passenger seat 4 as described above. Then, the module accessory of the user's choice may be secured to the module attachment assembly 20 or module receiver. For instance, the food receiving module 40 may be coupled to the module attachment assembly 20 when needed to support food items. Or, the food receiving module 40 may be easily removed and replaced by the compact disc holder 50, such as when driving so that CD's are close by for playing in the automobile. Or, the desk assembly 30 may be coupled to the mobile attachment assembly 20, such as for supporting a laptop computer 3 or the like.

It is understood that while certain forms of this invention have been illustrated and described, it is not limited thereto except insofar as such limitations are included in the following claims and allowable functional equivalents thereof.

The invention claimed is:

1. A portable workstation for a front passenger seat of a vehicle having a lap belt associated with the front passenger seat, said portable workstation comprising:
   a body member having a bottom wall, a pair of side walls, a rear wall, and a front wall that, together, form a box-shape having a closed bottom and that defines an open top and an interior area;
   wherein said pair of side walls includes a pair of lower edges that are each angled and increasingly offset from said bottom wall so as to define a sloped configuration complementary to a seat portion of the front passenger seat;
   wherein said front wall is perpendicular to said bottom wall and extends downwardly away from said bottom wall and is configured and operable to cling to the front passenger seat;
   a plurality of interior walls extending upwardly from said bottom wall and being spaced apart so as to define a plurality of compartments within said interior area, each said compartment having an open top so as to define an interior space operable to receive an article;
   a module attachment assembly having a plurality of upstanding side walls extending upwardly from said bottom wall of said body member and having a top surface connected to upper edges of said plurality of upstanding side walls and defining at least one receiver slot; and
   an accessory module having an attachment portion that includes at least one boss removably received in said at least one receiver slot, said accessory module having a lower wall coupled to said attachment portion and having a plurality of module side walls extending upwardly from said lower wall and defining an open top and an inner space configured to receive another article wherein said accessory module is a desk assembly, comprising: a primary base member having a bottom surface and a top surface opposite said bottom surface, said bottom surface and said top surface having planar and parallel configurations; a pivot fastener extending upwardly from a center point of said top surface; an auxiliary base member rotatably coupled to said pivot fastener and positioned atop said primary base member, said auxiliary base member being selectively rotatable 360 degrees about said pivot fastener; and a support member having a proximal edge pivotally coupled to a side edge of said auxiliary base member and having a planar configuration, said support member being pivotally movable between a closed configuration generally bearing against and parallel to an upper surface of said auxiliary base member and an open configuration displaced at an angle from said upper surface of said auxiliary base member; wherein said desk assembly includes a latch assembly comprising: a first rod movable between an engaged configuration coupled to said auxiliary base member and a released configuration displaced from said auxiliary base member, said auxiliary base member being allowed to rotate relative to said primary base member at said released configuration; a second rod movable between a normal configuration displaced from said primary base member and a compressed configuration compressing said spring and being proximate said primary base member; a linkage extending between said first and second rods that, when actuated, moves said first rod to said released configuration and said second rod to said compressed configuration.

2. The portable workstation as in claim 1, wherein said accessory module is a food receiving module comprising:
a first section in which said plurality of module side walls extend upwardly from said lower wall and which includes a front wall having a truncated configuration and a rear wall opposite said truncated front wall;
a second section coupled to one side of said first section having an auxiliary lower wall and a plurality of auxiliary side walls extending upwardly from said auxiliary lower wall that, together, define an open interior area configured to receive another article; and
a third section coupled to another side of said first section having another auxiliary lower wall and a continuous side wall extending upwardly from said another auxiliary lower wall so as to define another open interior area configured to receive a cup.

3. The portable workstation as in claim 1, wherein said accessory module is a compact disc holder, wherein said plurality of module side walls extend upwardly from said lower wall and include four upstanding walls defining an open top and an interior space configured to receive a plurality of compact discs or CD cases.

4. The portable workstation as in claim 1, wherein said support member includes a holding member that, together with a top surface of said support member, forms a U-shaped bracket extending away from said proximal edge and that is configured to support an electronic device.

5. The portable workstation as in claim 4, wherein said holding member comprises:
a first portion extending outwardly from said proximal edge and perpendicular to said top surface of said support member; and
a second portion coupled to and extending away from a distal end of said first portion and parallel to said top surface of said support member;
wherein said first and second portions of said holding member in association with said top surface of said support member have a U-shaped configuration configured to hold an electronic device.

6. The portable workstation as in claim 5, wherein said first portion of said holding member defines at least one slot configured to receive a cable electrically connected to the electronic device.

7. The portable workstation as in claim 4, wherein said U-shaped bracket defines at least one slot configured to receive a cable electrically connected to the electronic device.

8. The portable workstation as in claim 4, wherein:
said desk assembly includes a support arm that includes a generally linear configuration and having a free end and a bent end opposite said free end;
said support member includes a bottom surface opposite and parallel to said top surface of said support member, said bottom surface defining a recessed area having a configuration for receiving said bent end of said support arm; and
said support arm is configured to support said support member in said open configuration when said bent end is positioned in said recessed area of said support member.

9. The portable workstation as in claim 1, further comprising:
a safety belt having opposed ends, each end having a fastener such that said opposed ends of said belt are selectively coupled together about a back portion of the passenger seat of the vehicle;
wherein said rear of said body member defines first and second slots proximate the side walls, respectively, of the body member;
wherein inner surfaces of said rear wall, said bottom wall, and said side walls together define an inner underneath area;
wherein said slots are configured to receive said belt into said inner underneath area.

10. The portable workstation as in claim 1, further comprising a securing shelf extending between said side walls proximate said rear wall of said body member, said securing shelf configured to engage a lap seatbelt associated with the passenger seat of the vehicle.

11. A portable workstation for a front passenger seat of a vehicle having a lap belt associated with the front passenger seat, said portable workstation comprising:
a body member having a bottom wall, a pair of side walls, a rear wall, and a front wall that, together, form a box-shape having a closed bottom and that defines an open top and an interior area;
wherein said pair of side walls includes a pair of lower edges that are each angled and increasingly offset from said bottom wall so as to define a sloped configuration complementary to a seat portion of the front passenger seat;
wherein said front wall is perpendicular to said bottom wall and extends downwardly away from said bottom wall and is configured and operable to cling to the front passenger seat;
a securing shelf extending between said side walls proximate said rear wall of said body member, said securing shelf configured to engage a lap seatbelt associated with the passenger seat of the vehicle;
a plurality of interior walls extending upwardly from said bottom wall and being spaced apart so as to define a plurality of compartments within said interior area, each said compartment having an open top so as to define an interior space operable to receive an article;
a module attachment assembly having a plurality of upstanding side walls extending upwardly from said bottom wall of said body member and having a top surface connected to upper edges of said plurality of upstanding side walls and defining at least one receiver slot; and an accessory module having an attachment portion that includes at least one boss removably received in said at least one receiver slot, said accessory module having a lower wall coupled to said attachment portion and having a plurality of module side walls extending upwardly from said lower wall and defining an open top and an inner space configured to receive another article wherein said accessory module is a desk assembly, comprising: a primary base member having a bottom surface and a top surface opposite said bottom surface, said bottom surface and said top surface having planar and parallel configurations; a pivot fastener extending upwardly from a center point of said top surface; an auxiliary base member rotatably coupled to said pivot fastener and positioned atop said primary base member, said auxiliary base member being selectively rotatable 360 degrees about said pivot fastener; and a support member having a proximal edge pivotally coupled to a side edge of said auxiliary base member and having a planar configuration, said support member being pivotally movable between a closed configuration generally bearing against and parallel to an upper surface of said auxiliary base member and an open configuration displaced at an angle from said upper surface of said auxiliary base member; wherein said desk assembly includes a latch assembly comprising: a first rod movable between an engaged configuration coupled to said auxiliary base member and a released configuration displaced from said auxiliary base member, said auxiliary base member being allowed to rotate relative to said primary base member at said released configuration; a second rod movable between a normal configuration displaced from said primary base member and a compressed configuration compressing said spring and being proximate said primary base member; a linkage extending between said first and second rods that, when actuated, moves said first rod to said released configuration and said second rod to said compressed configuration.

12. The portable workstation as in claim 11, wherein said support member includes a holding member that, together with a top surface of said support member, forms a U-shaped bracket extending away from said proximal edge and that is configured to support an electronic device.

13. The portable workstation as in claim 12, wherein said holding member comprises:

a first portion extending outwardly from said proximal edge and perpendicular to said top surface of said support member; and
a second portion coupled to and extending away from a distal end of said first portion and parallel to said top surface of said support member;
wherein said first and second portions of said holding member in association with said top surface of said support member have a U-shaped configuration configured to hold an electronic device.

14. The portable workstation as in claim 13, wherein said first portion of said holding member defines at least one slot configured to receive a cable electrically connected to the electronic device.

15. The portable workstation as in claim 12, wherein said U-shaped bracket defines at least one slot configured to receive a cable electrically connected to the electronic device.

16. The portable workstation as in claim 11, wherein:
said desk assembly includes a support arm that includes a generally linear configuration and having a free end and a bent end opposite said free end;
said support member includes a bottom surface opposite and parallel to said top surface of said support member, said bottom surface defining a recessed area having a configuration for receiving said bent end of said support arm; and
said support arm is configured to support said support member in said open configuration when said bent end is positioned in said recessed area of said support member.

17. The portable workstation as in claim 11, wherein said accessory module is a food receiving module comprising:
a first section in which said plurality of module side walls extend upwardly from said lower wall and which includes a front wall having a truncated configuration and a rear wall opposite said truncated front wall;
a second section coupled to one side of said first section having an auxiliary lower wall and a plurality of auxiliary side walls extending upwardly from said auxiliary lower wall that, together, define an open interior area configured to receive another article; and
a third section coupled to another side of said first section having another auxiliary lower wall and a continuous side wall extending upwardly from said another auxiliary lower wall so as to define another open interior area configured to receive a cup.

* * * * *